United States Patent
Rogers et al.

(10) Patent No.: US 10,888,487 B1
(45) Date of Patent: Jan. 12, 2021

(54) GRASP ASSIST SYSTEM

(71) Applicant: United States of America as represented by the Administrator of the National Aeronautics and Space Administration, Washington, DC (US)

(72) Inventors: Jonathan M. Rogers, League City, TX (US); Benjamin J. Peters, Houston, TX (US); Evan Laske, Dickinson, TX (US); Emily R. McBryan, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 307 days.

(21) Appl. No.: 15/946,503

(22) Filed: Apr. 5, 2018

Related U.S. Application Data

(60) Provisional application No. 62/529,831, filed on Jul. 7, 2017, provisional application No. 62/482,658, filed on Apr. 6, 2017.

(51) Int. Cl.
*A61H 1/02* (2006.01)
*A41D 19/015* (2006.01)

(52) U.S. Cl.
CPC ..... *A61H 1/0288* (2013.01); *A41D 19/01547* (2013.01); *A61H 2201/14* (2013.01); *A61H 2201/165* (2013.01); *A61H 2201/5061* (2013.01)

(58) Field of Classification Search
CPC .............. A61H 1/0288; A61H 2201/14; A61H 2201/165; A61H 2201/5061;
(Continued)

(56) References Cited

U.S. PATENT DOCUMENTS 3,564,614 A * 2/1971 Getchell et al. ..... A41D 19/015
2/2.11
6,312,398 B1 11/2001 Cencer
(Continued)

FOREIGN PATENT DOCUMENTS

WO 2012165880 A2 12/2012
WO 2015134336 A2 9/2015

OTHER PUBLICATIONS

"Products: VMG 30 Plus" Virtual Motion Labs. virtualmotionlabs. com. May 13, 2016. https://web-beta.archive.org/web/20160513232423/http://www.virtualmotionlabs.com/vr-gloves/vmg-30-plus/.
(Continued)

*Primary Examiner* — Christie L Bahena
(74) *Attorney, Agent, or Firm* — Kurt G. Hammerle; Edward K. Fein

(57) ABSTRACT

A grasp assist system includes a glove having a glove palm and fingers, with the glove worn on a user's hand. A sensor measures flexion of the glove fingers, and thus a change of position and/or attitude of the fingers is determined. Finger saddles at least partially surround a phalange of a respective one of the user's fingers. The system uses one or more tendon actuators to pull on flexible tendons. Each tendon connects to a respective finger saddle. A controller is in communication with the actuators and sensor(s). The glove may use feedback from optional contact sensors to adjust tension, and may have a built-in restorative force. In executing a control method, the controller selectively applies tension to the tendons in response to finger flexion, via the tendon actuators, at a level sufficient for moving the user's fingers when the user executes a hand maneuver.

11 Claims, 5 Drawing Sheets

(58) Field of Classification Search
CPC ........ A41D 19/01547; A41D 19/01582; A61F 5/013; A61F 5/05866; A61F 2005/0155
See application file for complete search history.

(56) References Cited

U.S. PATENT DOCUMENTS

| | | | |
|---|---|---|---|
| 6,413,229 | B1 | 7/2002 | Kramer et al. |
| 7,410,338 | B2 | 8/2008 | Schiele et al. |
| 8,029,414 | B2 | 10/2011 | Ingvast et al. |
| 8,255,079 | B2 | 8/2012 | Linn et al. |
| 8,467,903 | B2 | 6/2013 | Ihrke et al. |
| 9,067,325 | B2 | 6/2015 | Ihrke et al. |
| 9,149,933 | B2 | 10/2015 | Ihrke et al. |
| 2008/0071386 | A1* | 3/2008 | McBean ............... A61F 5/0127 623/25 |
| 2011/0113631 | A1* | 5/2011 | Zdunek ................ B26B 21/00 30/34.05 |
| 2011/0185473 | A1* | 8/2011 | Voravan ................ A41D 19/00 2/161.2 |
| 2013/0231595 | A1* | 9/2013 | Zoss ...................... A61H 1/00 601/34 |
| 2016/0052130 | A1 | 2/2016 | Ekas |
| 2017/0168565 | A1* | 6/2017 | Cohen .................. A61B 5/0022 |
| 2018/0168830 | A1* | 6/2018 | Evans ...................... A61F 2/70 |
| 2019/0060099 | A1* | 2/2019 | Ciocarlie ............ A61H 1/0288 |

OTHER PUBLICATIONS

Delph, Michael A., et al. "A soft robotic exomusculature glove with integrated sEMG sensing for hand rehabilitation." Rehabilitation Robotics (ICORR), 2013 IEEE International Conference on. IEEE, 2013. https://www.ncbi.mlm.nih.gov/pubmed/24187244.

Miller, Laura C., et al. "A wrist and finger force sensor module for use during movements of the upper limb in chronic hemiparetic stroke." https://www.ncbi.nlm.nih.gov/pmc/articles/PMC2894619.

Bettex, Morgan. "Lending a hand: MIT researchers may be closer to understanding why spacesuit gloves hurt astronauts' hands," MIT News, news.mit.edu. Oct. 13, 2010. http://news.mit.edu/2010/astronaut-gloves-1013.

Walters, Ray. "Human Grasp Assist prevents astronauts RSI, looks like a Power Glove." Geek-Cetera, geek.com. Mar. 15, 2012. http://www.geek.com/geek-cetera/human-grasp-assist-robotic-gloves-1476027/.

* cited by examiner

GRASP ASSIST SYSTEM

CROSS-REFERENCE TO RELATED APPLICATIONS

This application claims priority to and the benefit of U.S. Provisional Application Ser. No. 62/482,658 filed on Apr. 6, 2017, and U.S. Provisional Application Ser. No. 62/529,831 filed on Jul. 7, 2017, the entire contents of which are hereby incorporated by reference.

STATEMENT REGARDING FEDERALLY SPONSORED RESEARCH OR DEVELOPMENT

This invention described herein was made by employees of the United States Government, and may be manufactured and used by or for the United States Government for governmental purposes without the payment of royalties thereon or therefor.

TECHNICAL FIELD

The present disclosure relates to a glove-based grasp assist system and a control method for the same.

SUMMARY

A glove-based grasp assist system and related control method are disclosed herein. The grasp assist system selectively assists the natural hand and finger motion of a human operator/user using a tendon drive system. Such assistance may be desirable when helping the user overcome the bending stiffness of certain types of specialized work or recreational gloves, e.g., gloves for use in aerospace applications, recreational diving, industrial work applications, or rehabilitation or treatment of users having limited finger strength and dexterity.

A power-actuated glove is worn over the user's hand to form a core element of the disclosed system. Power assist capabilities of the system are selectively provided by one or more connected glove actuators, which bend the user's fingers via applied tension to one or more flexible artificial tendons when the user executes a hand maneuver. As used herein, the term "hand maneuver" refers to any user-initiated, muscle-based motion of the user's hands involving manual flexing of the user's fingers and/or thumb, regardless of whether the user actually grasps or otherwise makes contact with an external object during the grasp maneuver. In other words, the user decides when and how far to move his or her fingers/thumb. The system automatically assists in moving the user's fingers via tendon tensioning in response to such user-initiated motion. Exemplary hand maneuvers may include the grasping of a work tool or the act of flexing the fingers of the user's empty hand against the natural resistance of the glove as noted above.

The user's individual fingers have freedom to move by the user's volition when the glove actuators are unpowered. Such freedom of digital movement enables the user to enjoy tactile feedback at levels sufficient for performing work tasks requiring ordinary levels of finger dexterity. When mechanized grasp assistance is required, the glove actuators are selectively energized via commands from a controller. This action occurs in response to the flexion and subsequent motion of the user's fingers, with such motion augmented in an optional embodiment in response to contact between the glove and an external object.

An example embodiment of the grasp assist system includes a glove, a flexion sensor, finger saddles, one or more glove actuators, flexible tendons, and a controller. The glove, which has a palm and a plurality of glove fingers, is configured to be worn on a hand of the user. The flexion sensor measures or otherwise determines a level of flexion of each of the glove fingers when the user executes the hand maneuver defined above, and in this manner determines motion and/or relative position of the glove fingers. The finger saddles partially surround a phalange of a respective one of the glove fingers. The flexible tendons are connected at opposite ends to the actuator(s) and to a respective one of the finger saddles.

The controller in this illustrative embodiment is in communication with the at least one actuator and the flexion sensor, and is configured, in response to the relative position, to selectively apply tension to the flexible tendons via the actuator(s). This tension occurs at a force level sufficient for moving the user's fingers when the user executes the hand maneuver.

The flexion sensor may include string potentiometers extending along a posterior side of fingers of the glove. In other embodiments, the function of the flexion sensor may include motion capture sensing, flexible/variable resistance sensors that directly measure flexion of the user's fingers, and/or angle sensors positioned on the glove fingers and configured to measure joint angles between adjacent phalanges of the user's fingers or other portions of the user's hand.

Some embodiments of the glove include a bladder layer configured to be worn on, and in direct contact with, the user's hand, with the glove also including a restraint layer surrounding the bladder layer, a hardware layer containing the actuator and possibly the controller, and an outer layer surrounding the restraint and hardware layers.

The glove may optionally include a ratchet mechanism configured to adjust the fit of the glove, and a generally arcuate-shaped palm bar connected to opposite sides of the restraint layer. In such an embodiment, e.g., a space glove configuration, the palm bar defines internal passages through the width of the palm bar. The tendons pass through and are circumscribed by such defined passages, with distal ends of the palm bar mechanically coupled to the ratchet mechanism, such as via strings or wires.

The glove may be configured to provide a built-in restorative force such that, when the user releases the user's grasp or otherwise initiates a relaxed hand pose, the built-in restorative force assists in the return of the tendons and the glove fingers to a relaxed default position. The above-noted bladder layer may be connected to and pressurized by an external pressure supply, with pressurization of the bladder layer by the external pressure supply providing the optional restorative force.

The glove may also include contact sensors connected to some or all of the glove fingers and/or other portions of the glove. The contact sensors may be used to detect contact of the glove with an external object during execution of the hand maneuver. The controller in such an embodiment may adjust tension on the flexible tendons via the actuator(s) in response to the detected contact.

In a non-limiting example configuration, the grasp assist system may be configured for use in as part of an Extravehicular Activity (EVA) space glove. That is, the system is securely connected to a pressurized spacesuit via a wrist disconnect ring mechanism. Existing spacesuit pressurization systems may be used, or a separate compressed gas supply or other return force mechanism may be used for this purpose, e.g., a pressurized air tank in a possible scuba diving application, pressurized glove for physical therapy, etc.

A method for controlling the grasp assist system includes measuring, via a flexion sensor, a level of flexion and thus changes in relative position of the glove fingers in a given frame of reference. Responsive to the measured flexion, the controller commands an actuator to apply tension to one of more flexible tendons at a tension level sufficient for gently moving the user's fingers when the user executes a hand maneuver. The tendons are operatively connected to the glove fingers via flexible finger saddles, with each finger saddle at least partially surrounding a phalange of a respective one of the glove fingers.

Another embodiment of the grasp assist system includes a glove having a palm and fingers, configured to be worn on a hand of a user, and including a pressurizable bladder layer, a restraint layer to which is attached a palm bar spanning a width of the glove palm, a hardware layer containing the one or more tendon actuators and the controller, and an outer layer surrounding the restraint and hardware layers. A flexion sensor measures a level of flexion of each glove finger, which in a non-limiting embodiment includes string potentiometers extending along a posterior surface of the glove fingers. Finger saddles at least partially surround a phalange of a respective one of the glove fingers. Flexible tendons, driven by one or more of the tendon actuators, are connected to a respective one of the finger saddles. Pressurization of the bladder layer provides a built-in restorative force such that, when the hand of the user is in a relaxed state, the built-in restorative force assists in a return of the tendons to a relaxed default position.

The system includes a cable or conduit manifold connected to a palm-side of the restraint layer adjacent to the palm bar. Each tendon is contained within respective conduits to form a Bowden cable system in which each of the conduits is received within the cable or conduit manifold. A controller in communication with the one or more tendon actuators and the sensor, in response to the measured or detected flexion, selectively applies tension to the flexible tendons via the tendon actuators at a tension level sufficient for gently moving the user's/glove's fingers when the user executes a grasp maneuver.

The above summary is not intended to represent every embodiment or aspect of the present disclosure. Rather, the foregoing summary exemplifies certain novel aspects and features as set forth herein. The above noted and other features and advantages of the present disclosure will be more easily understood from the following detailed description of representative embodiments and modes for carrying out the present disclosure when taken in connection with the accompanying drawings and the appended claims.

Figure 1:
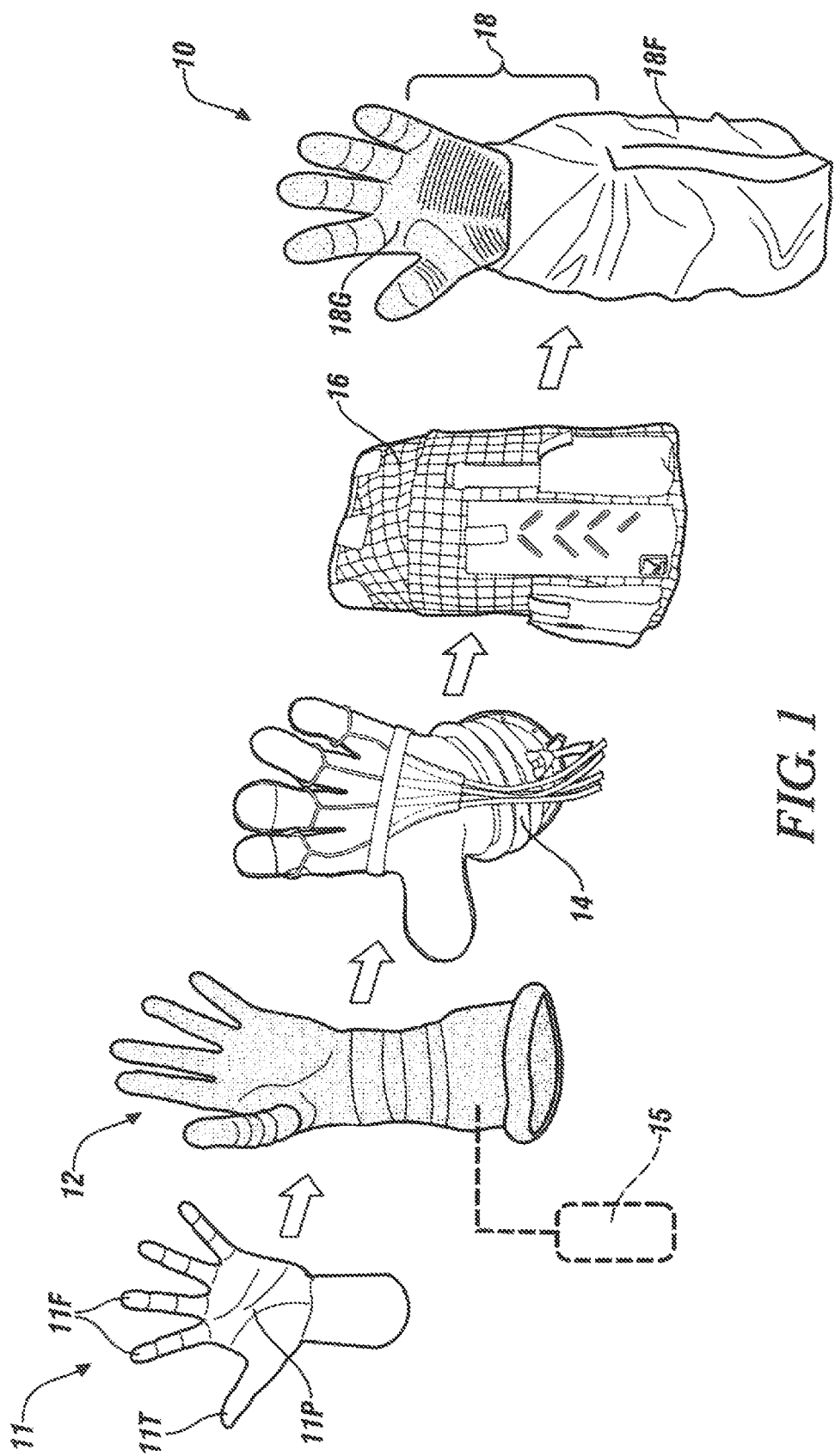
FIG. 1 is a schematic illustration of an embodiment of a glove-based grasp assist system as described herein.

The present disclosure is susceptible to modifications and alternative forms, with representative embodiments shown by way of example in the drawings and described in detail below. However, inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

With reference to the drawings, wherein like reference numbers refer to the same or similar components throughout the several views, an embodiment of a grasp assist system 10 as described herein is shown schematically in FIG. 1. The system 10, which is configured to be worn as a glove on either hand 11 of a human user (although the illustration in FIG. 1 shows by non-limiting example the left hand), selectively assists the user in executing a hand maneuver in which the user initiates movement of the user's fingers 11F and/or a thumb 11T. The system 10 may be connectable to, and configured for use as a part of, a pressurized space suit (not shown) of the type used in aerospace operations, e.g., the Extravehicular Mobility Unit (EMU), the Prototype Exploration Suit (PXS), the Advanced Prototype Suit (Z2), etc. Non-aerospace applications may also be realized, such as manufacturing, construction, or medical rehabilitation, or recreational applications such as scuba diving, and therefore the space glove application described herein is merely illustrative of the general concepts of the embodiments.

As shown in FIG. 1, the grasp assist system 10 may be a multi-layered glove to include an optional inner bladder layer 12 worn on/immediately adjacent to the hand 11, an intermediate restraint layer 14, a hardware layer 16 containing one or more drivetrains 20 and a controller 50 (see FIGS. 2 and 3), and an optional protective outer layer 18. The outer layer 18 has a glove portion 18G and a forearm portion 18F, with the protective outer layer 18 configured for wear over the hardware layer 16. For simplicity, the term "glove" will be used herein to refer generally to the one or more layers comprising the optional bladder layer 12, when used, as well as the restraint layer 14, the hardware layer 16, and the optional outer glove portion 180 (when used).

With respect to the optional bladder layer 12, this flexible structure may be constructed of a suitable polymer or rubber material. In the example of a space glove embodiment, for instance, the bladder layer 12 may be connected to a pressurized space suit (not shown). In non-aerospace applications, the bladder layer 12 may be connected to an external pressure supply 15, e.g., a pressurized space suit, a pneumatic accumulator or other canister of compressed air or other suitable inert gas, or a scuba tank in an exemplary scuba application, such that the bladder layer 12 is able to be selectively pressurized. That is, air from the pressure supply 15 or a pressurized space suit flows under pressure to the bladder layer 12 between the user's hand 11 and the inner surfaces of the bladder layer 12. As set forth herein, such an embodiment, or another embodiment using mechanical springs or other suitable devices, may facilitate a built-in restorative force for returning the user's hand 11 to a relaxed "open" pose as a default position, as opposed to a "closed" or "grasping" position such as when the system 10 is assisting in the grasping of an object in the user's hand.

The restraint layer 14 functions by retaining shape of the bladder layer 12 to the fingers 11F, thumb 11T, and a palm 11P of the user's hand 11, as well as by protecting and insulating the user's hand 11. As set forth below with particular reference to FIGS. 2 and 4-6, the restraint layer 14 is equipped with portions of one or more drivetrain(s) 20 and other components that operatively connect to the user's fingers 11F, and, in some embodiments, the user's thumb 11T. The term "drivetrain" as used herein comprises components shown in FIG. 2, starting from the actuator 22 to the finger saddle 28, i.e., actuator 22, conduit 24, tendon 25, palm bar 26, and saddle 28 for a given drivetrain 20. The restraint layer 14 may be optionally constructed of a suitable low-density, high-performance material. For instance, the restraint layer may be constructed of a polytrophic liquid crystal polymer, e.g., VECTRAN™.

Figure 2:
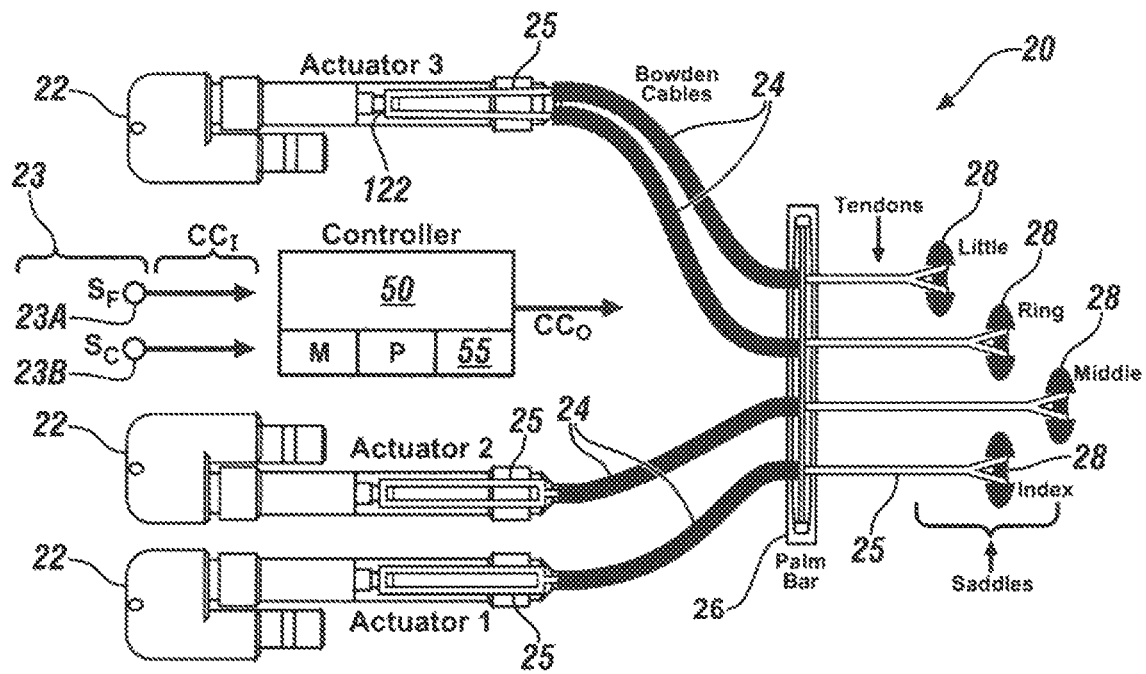
FIG. 2 is a schematic illustration of an embodiment of a control configuration for the system shown in FIG. 1.
Figure 3:
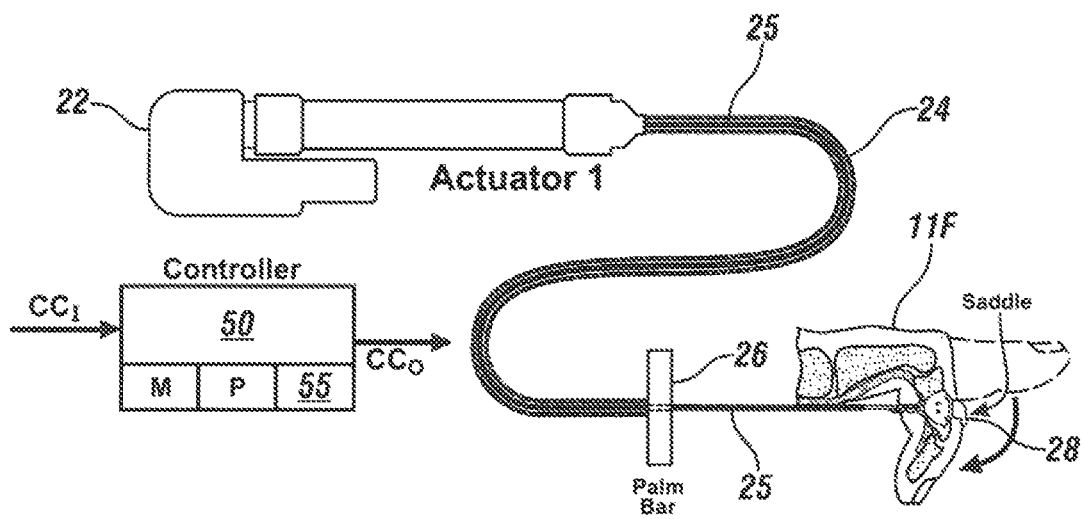
FIG. 3 is schematic illustration of an alternative single-actuator control configuration.
Figure 7:
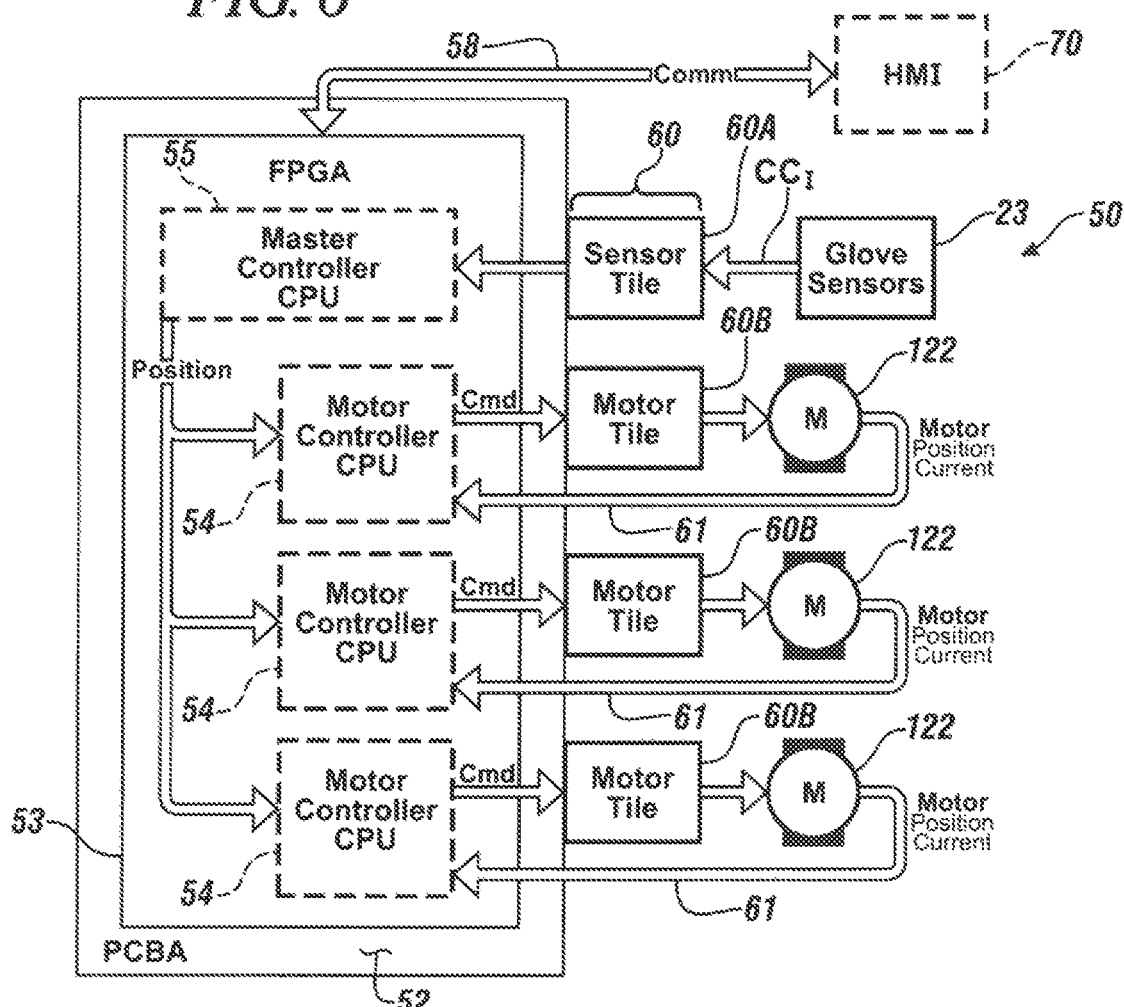
FIG. 7 is a schematic data flow diagram describing an embodiment of a control architecture that is usable with the grasp assist system described herein.

The hardware layer 16, which may be worn on the user's wrist and forearm (not identified specifically in FIG. 1 but understood to be an extension of the arm of the user's hand below the palm 11P), contains one or more tendon actuators 22 and, in some embodiments, may also contain a controller 50 (see FIGS. 2, 3, and 7). In other embodiments, the controller 50 may reside outside of the hardware layer 16, such as on a belt or backpack (not shown), or may be wirelessly/remotely connected. For instance, the hardware layer 16 may be mounted on the posterior side of the user's forearm between the restraint layer 14 and the outer layer 18. The hardware layer 16 may in some embodiments be attached to the underside of the optional outer layer 18, such as via a hook-and-loop connection, magnetically, or using zippers, snap closures, or other application-suitable fasteners.

In some embodiments, the optional outer layer 18 wraps around, covers, and protects the restraint layer 14 and the hardware layer 16 from dust, debris, and other hazards. The glove portion 18G covers and protects the restraint layer 14, while the forearm portion 18F forms a protective wrap around the hardware layer 16. Suitable materials of construction of the outer layer 18, particularly the glove portion 18G, may include puncture-resistant/fiber-reinforced silicon rubber finger caps. e.g., KEVLAR™, a suitable flame-retardant fabric material, etc. The forearm portion 18F forms a gauntlet and may be constructed, e.g., of a reinforced biaxially-oriented polyethylene terephthalate (BoPET) material and polytetrafluoroethylene (PTFE) fabric. When the grasp assist system 10 is used in the embodiment of a space application noted above, the outer layer 18 may be embodied as a Thermal Micrometeoroid Garment (TMG) constructed of a blend of waterproof, impact resistant, and fire resistant fabrics, with similar or different materials used in other embodiments depending on the application.

FIG. 2 depicts one example of the drivetrain 20 for use with the grasp assist system 10 described herein. The controller 50, described in further detail below with particular reference to FIG. 7, receives input signals (arrow $CC_I$) from glove sensors 23, including one or more flexion sensors ($S_F$) 23A and optional contact sensors ($S_C$) 23B as described in detail below with reference to FIGS. 5 and 6, respectively. In response to receipt of the input signals (arrow $CC_I$), the controller 50 calculates required tensile forces and then, via a set of control signals (arrow $CC_O$), drives a plurality of the tendon actuators 22, with the tendon actuators 22 also labeled Actuators 1, 2, and 3 in FIG. 2. The driven tendon actuators 22 apply the calculated tensile forces to a set of conduits 24, for instance a Bowden cable system in which a hollow outer conduit (made of stainless steel or other suitable material) is lined with PTFE or other suitable wear-resistant coating and contains a flexible tendon 25 located therein. Thus, the calculated tensile forces are automatically applied to some or all of the conduits 24 and tendons 25 in response to the input signals (arrow $CC_I$) from the glove sensors 23.

The drivetrain 20 may be configured to drive a conventional full grasp, or to drive fewer fingers 11F of the hand 11 shown in FIG. 1, with or without driving the thumb 11T. Connected to the restraint layer 14, e.g., sewn into place, may be a plurality of finger saddles 28 or other suitable load bearing structure. Each finger saddle 28 may partially circumscribe a respective digit of the operator's hand 11 (see FIG. 1) when the restraint layer 14 is worn by the user. Tensile forces are imparted to the drive tendons 25, which are operatively integrated within the accompanying conduits 24 and joined to the restraint layer 14 by a palm bar 26 as shown, thus indirectly acting on the user's fingers 11F/thumb 11T through the intervening finger saddles 28 when the restraint layer 14 is worn. For added clarity, the finger saddles 28 are also labeled in FIG. 2 as "little", "ring", "middle", and "index" corresponding to the particular finger 11F of the operator's hand 11 depicted in FIG. 1.

The finger saddles 28 smoothly distribute tensile/pulling forces generated by the tendon actuators 22. Such forces are transmitted along the tendons 25 across the posterior of the medial phalanges of the user's fingers 11F. In some embodiments, the finger saddles 28 may be constructed of thermoplastic polyurethane (TPU)-coated nylon straps that are laser cut to form a band having flared or lobed ends forming anchors (see FIG. 3) that ultimately interface with the tendons 25. The band may be otherwise substantially rectangular in shape (FIG. 5), with an anchor optionally formed on either end of the band to interface with the tendon 25 as shown in FIG. 2. The individual finger saddles 28 should be sufficiently flexible to enable the finger saddles 28 to contour around the user's fingers 11F when a mating tendon 25 is under tension. The tendons 25 themselves may be configured as a braid of multiple high-strength, wear-resistance materials, e.g., braided TEFLON™ and VECTRAN™ or other suitable fibers.

Three tendon actuators 22 are used with the tendons 25 in the illustrated example embodiment of FIG. 2. Each tendon 25 may be tied into a Brummel eye-splice to securely engage the actuator 22, e.g., via a tendon fastener or hook 122 connected thereto, and the finger saddles 28. The tendon actuators 22 may use rotary and/or linear motion to selectively apply tension to the tendons 25. The thumb 11T, the primary fingers (i.e, the index and middle fingers), and the secondary fingers (ring and little) 11F of the user's hand 11 (FIG. 1) may each have a dedicated tendon actuator 22, similar to the tendon-actuator assembly as disclosed in U.S. Pat. No. 8,255,079, which is hereby incorporated by reference in its entirety. FIG. 2 shows the index and middle fingers (11F) each having its own dedicated tendon actuator 22. Alternatively, the secondary fingers 11F, commonly referred to as the ring and little fingers, may be coupled to a single shared actuator 22 as shown in FIG. 2. An example embodiment of a shared tendon actuator assembly is also described in U.S. Pat. No. 9,149,933, which is likewise incorporated herein by reference in its entirety. Other actuators such as pulley systems or other types of solenoid drive systems may be used in lieu of the incorporated tendon actuators 22, without limitation, and therefore the tendon actuators 22 are not limited to rotary ball screw embodiments.

As described in the incorporated references, each tendon actuator 22 used as part of the grasp assist system 10 may include a motor, e.g., a brushless DC motor, a gearbox, and a ball screw assembly into its construction. In some embodiments, the motor may be paired with a 4.4:1 planetary gearbox separated by a 1:1 spur gearbox, all of which allows the ball screw to be positioned in parallel with the motor to reduce the overall length of the actuator 22. The gearbox may be connected directly to the ball screw rather than the motor to decrease the level of backlash seen by the gearbox and motor. One example configuration provides about 3.15 inches (80 mm) of linear travel within the tendon actuator 22, which determines the amount of assisted flexion the actuator 22 is able to provide. Non-limiting example specifications include overall dimensions of 0.97×1.76×6.71 inches (24.6 mm×44.7 mm×170.4 mm), peak force output of 36.7 lbs (163 N), a maximum speed of 3.58 inches/second (90.9 mm/sec), with a torque constant of 0.096 inch lbs/Amp (10.9 mNm/Amp).

Referring now to the single-actuator embodiment of FIG. 3, movement of a given finger 11F occurs when the tendon actuator 22 pulls on a tendon 25 moving through a hollow outer conduit 24, which transfers a mechanical pulling force on the inner cable, i.e., the tendon 25, relative to the hollow outer conduit and mounted palm bar 26, similar to operation of a bicycle brake using a Bowden cable system. The outer cable 24 may be constructed of a stainless steel conduit lined with an abrasion-free material such as PTFE. The conduit 24 of the Bowden cable system in such an embodiment possesses high strength in the axial direction while remaining flexible in all other directions, such that the conduit does not impede the user's wrist movements. Providing such a conduit also provides structural support between the tendon actuators 22 and the palm bar 26, thereby maintaining relative positioning of the palm bar 26 and the tendon actuators 22 as static under dynamic loading conditions.

In operation when the glove is worn, the tendon actuators 22 pull on the tendons 25 which route up through the hardware layer 16 of FIG. 1 to the restraint layer 14 through the conduits 24 anchored at the palm bar 26, and looping around the finger saddles 28 located on the medial joints of the user's fingers 11F. As the tendon actuator 22 pulls the tendon(s) 25, the user's finger 11F is guided into a flexed position as shown in FIG. 3. The user may provide an extension force to open his or her hand in one embodiment.

In another embodiment, the extension force or "restorative" force is automatically implemented when the controller 50 determines that the user's grasp is being released. One possible approach for providing the restorative force is use of the pressurized bladder layer 12 and the pressure supply 15 shown in FIG. 1, or using mechanical springs embedded in the glove portion 180 or other parts of the glove. The restraint layer 14 becomes a semi-rigid body when the bladder layer 12 is pressurized. When the user's grip releases and transitions to a relaxed state, interposition of the pressurized bladder layer 12 between the hand 11 and the restraint layer 14 passively returns the pulling tendons 25 into an initial relaxed/non-grasping pose.

Figure 4:
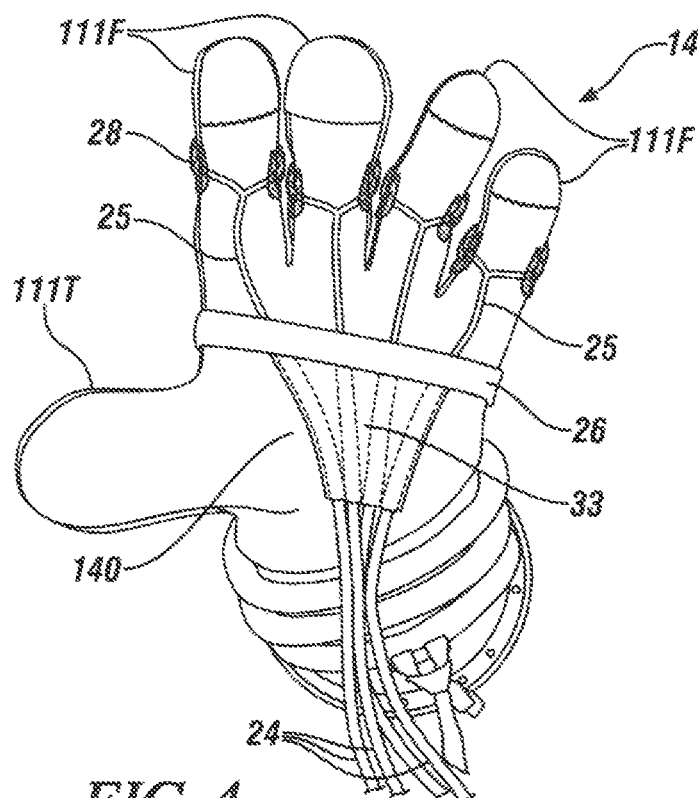
FIG. 4 is a more detailed perspective view illustration on the palm side of the grasp assist system of FIG. 1.
Figure 5:
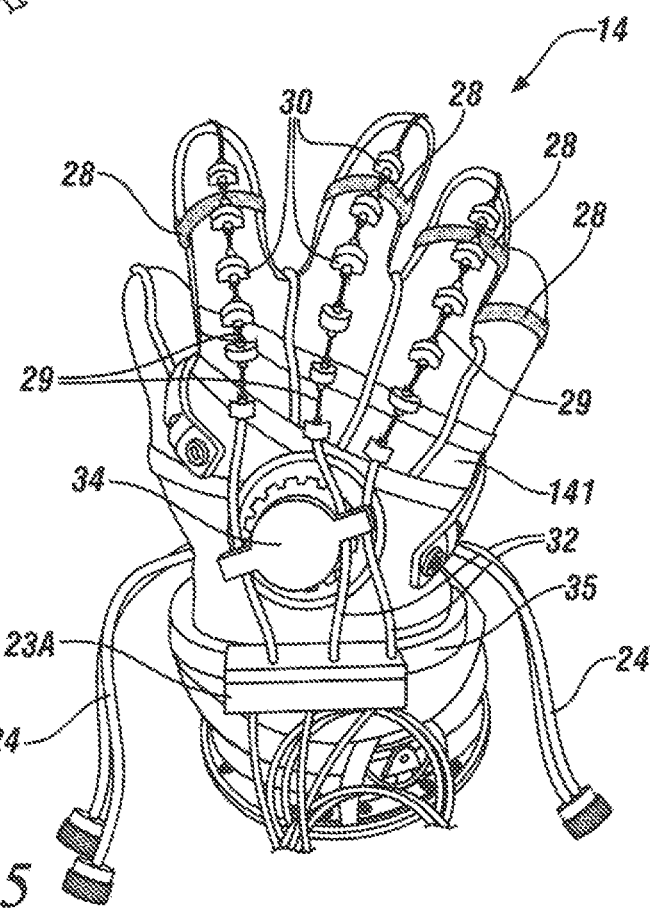
FIG. 5 is a more detailed perspective view illustration of a grasp assist system from the back of the user's right hand in accordance with one or more embodiments described herein.

FIG. 4 is a more detailed perspective view illustration of the palm-side 140 of the restraint layer 14 shown in FIG. 1, with glove fingers 111F and a glove thumb 111T shown for an example left-handed glove. FIG. 5 is a more detailed perspective view illustration of the grasp assist system 10 from the posterior or back side of the user's right hand in accordance with a right-handed glove system described herein. Depicted in these views are the finger saddles 28, the conduits 24, and the palm bar 26 noted above with reference to FIG. 2. Wherever motion of the tendon actuators 22 or other components of the grasp assist system 10 could potentially rub on or abrade contact areas of the restraint layer 14 due to relative motion, such contact areas may be shielded with reinforced patches of PTFE fabric or other suitable wear-resistant materials. The tendons 25 loop around the finger saddles 28 as shown, e.g., using an example Brummel eye-splice that includes a Brummel loop. The Brummel loop, when placed under tension, cinches down upon itself in a manner similar to a Chinese finger trap. Friction from this connection cancels out the longitudinal force of tension on the tendon 25, and the braid of the tendons 25 distributes loads across an area to avoid stress concentrations.

Referring now to FIG. 5, this view depicts possible placement of sensor cable restraints 30, sensor conduits 32, flexion sensors 23A, and the finger saddles 28 on the restraint layer 14. The sensor cable restraints 30 may be segmented and spaced apart as shown, with a plurality of sensor cable restraints 30 used per finger of the restraint layer 14. The flexion sensors 23A noted above, which may be optionally embodied as string potentiometers 29 as shown, or as motion capture devices, bend sensors, joint angle sensors, or other suitable sensors, are used to track finger flexion and a resultant change in relative position and attitude (e.g., pitch, yaw, roll) in free space of each phalange of the user's fingers 11F (see FIGS. 1 and 3) relative to the user's palm 11P or another reference position. This measurement allows the controller 50 to determine the relative positions and/or attitudes in free space of each of the fingers 11F and, when used, the thumb 11T. To avoid adversely affecting durability of the bladder layer 12, the flexion sensors 23A may be integrated outside of the restraint layer 14 as shown, such as by using a fabric-tape addition on the outside of the restraint layer 14. Depending on the selected operating mode, as the user's fingers flex, the tendon actuators 22 of FIGS. 2 and 3 may respond with synchronized grasp assistance, thereby offering intuitive operation of the grasp assist system 10.

Figure 6:
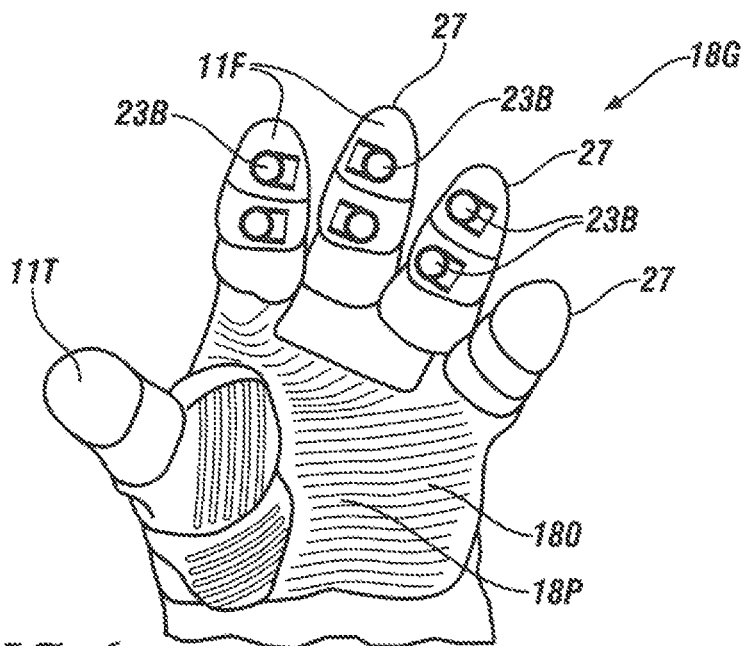
FIG. 6 is a perspective view illustration of possible sensor placement on the palm side of the fingers of the system depicted in FIG. 4.

Referring now to FIG. 6, the optional contact sensors 23B noted above with reference to FIG. 2, in some embodiments, may be embedded on phalanges of the glove portion 18G, e.g., proximal, medial, and/or distal phalanges, such as in the outer layer 18 as shown or the restraint layer 14. Such locations provide strong grasp assistance when the contact sensors 23B are triggered by external contact. The contact sensors 23B, which may be embodied as Force Sensitive Resistors (FSR), are used to detect a force (e.g., contact) upon the fingers 11F when the user interacts with external objects or tools. The contact sensors 23B report such contact to the controller 50 shown in FIG. 7.

For instance, some or all of the contact sensors 23B may be optionally embodied as load sensors or force sensors, e.g., FSRs embedded on phalanges of the index, middle, and/or ring fingers. FSRs are commercially-available flexible circuits made of conductive ink laminated between layers of plastic, e.g., from TEKSCAN, INC., of South Boston, Mass. Such contact sensors 23B may be placed directly on the fabric of the outer layer 18, such as beneath existing fingertip pads 27 thereof, portions of which are removed in the view of FIG. 6 to show the location of the contact sensors 23B. After such placement, the openings shown in FIG. 6 may be potted and sealed in place using a silicone adhesive or other suitable sealing material. In a hard-wired sensor embodiment, wires (not shown) from the contact sensors 23B may pass through the fabric of the outer layer 18, with such wires then sewn along the inside of the restraint layer 14 or the glove portion 18G. The contact sensors 23B may be optionally sandwiched between two semi-rigid rubber discs (not shown) to focus applied forces through the body of the contact sensors 23B.

In order to ensure adequate contact with conductive ink in the above-noted FSR embodiment, a layer of plastic laminate may be cut away from each of the contact sensors 23B so as to expose a conductive surface with which sensor wires can make good electrical contact. Conductors of interfacing sensor wires may be sewn through leads of the contact sensors 23B and any surrounding plastic laminate structure, with a small amount of conductive epoxy adhesive, e.g., a silver-based epoxy having good low and high temperature performance, such as about −50° C. to +170° C., and low resistivity of about $1 \times 10^{-4}$ Ω·cm. One such product is AA-DUCT 907, commercially available from ATOM ADHESIVES of Providence, R.I. The epoxy may be placed on such exposed openings to maintain a strong and stable electrical connection. The sensor wire may also be strain-relieved into plastic laminate bordering the force sensing circuit. Thereafter, the entire interface may be sealed with an adhesive sealant, e.g., a silicon elastomer such as 3145 RTV available from DOW CORNING®, to produce a reliable, low-profile flexible sensor.

Referring to FIGS. 4-6, in general the flexion sensors 23A may be used to determine displacement or changing relative position of the phalanges, in real time, relative to the palm 11P for the user's index, middle, and ring fingers 11F. Such flexion sensors 23A may be optionally placed on the posterior of the user's hand 11 as shown in FIG. 5 and mounted on the restraint layer 14. The flexion sensors 23A may be mounted on a custom plate attached to a stainless steel wrist cuff 35, e.g., in the above-noted space glove embodiment. When string potentiometers 29 are used for the flexion sensors 23A, sensor strings (see FIG. 5) from the string potentiometers 29 route up the posterior side 141 of the restraint layer 14, around a ratchet mechanism 34 used to selectively adjust the fit of the restraint layer 14, through a PTFE-lined conduit 32, up the fingers 11F through the segmented sensor cable restraints 30, and link to a fabric seam located at the tip of the distal phalanges as shown.

Although only the distal finger saddles 28 are shown in FIGS. 4 and 5 for illustrative simplicity, multiple different types of finger saddles 28 may be provided. For instance, finger saddles 28 may be positioned at the distal ends of each finger 11F as shown, or medial and proximal finger saddles 28 may be additionally used. The tendons 25 terminate at the distal finger saddles 28, as shown in FIGS. 4 and 5. Medial and proximal versions of the finger saddles 28, when used, may serve to guide or direct the tendons 25 and help support the user's fingers 11F.

The palm bar 26, shown in part in FIG. 4, serves as a sturdy anchor for the conduits 24, which are routed into the palm bar 26 as described below with reference to FIG. 8. In this manner, the palm bar 26 ensures that structural components of the restraint layer 14 are securely fitted to the user's hand 11. The palm bar 26 may be configured with application-suitable fit and curvature, e.g., for the Phase VI space suit glove manufactured by ILC DOVER, LP, of Frederica, Del., modified to include passageways for the tendons 25 and mounting fixtures for the conduits 24.

A flexible conduit manifold 33 constructed of fabric or other suitable textile may be used to concentrate and attach the conduits 24 to the palm-side 140 adjacent to the palm bar 26. As noted above, each tendon 25 is contained within a respective conduit to form the cable system. e.g., a Bowden cable system, with the conduits 24 received within the manifold 33. The tendons 25 emerge from the palm bar 26 and extend along and/or around the fingers of the restraint layer 14 as shown with operable connection to each respective saddle 28. In some embodiments, the palm bar 26 may be constructed of 316 Stainless Steel (SS), for instance, using a direct metal laser sintering process, and integrated with the ratchet mechanism 34 located on the posterior 141 as shown in FIG. 5, so that the palm bar 26, located on an opposite side of the glove from the ratchet mechanism 34, is adjustable during use via rotation of the ratchet mechanism 34. The palm bar 26 thus acts an anchor or ground for the conduits 24, and thus is configured to withstand force loads in excess of loads experienced by a typical space suit palm bar.

Figure 8:
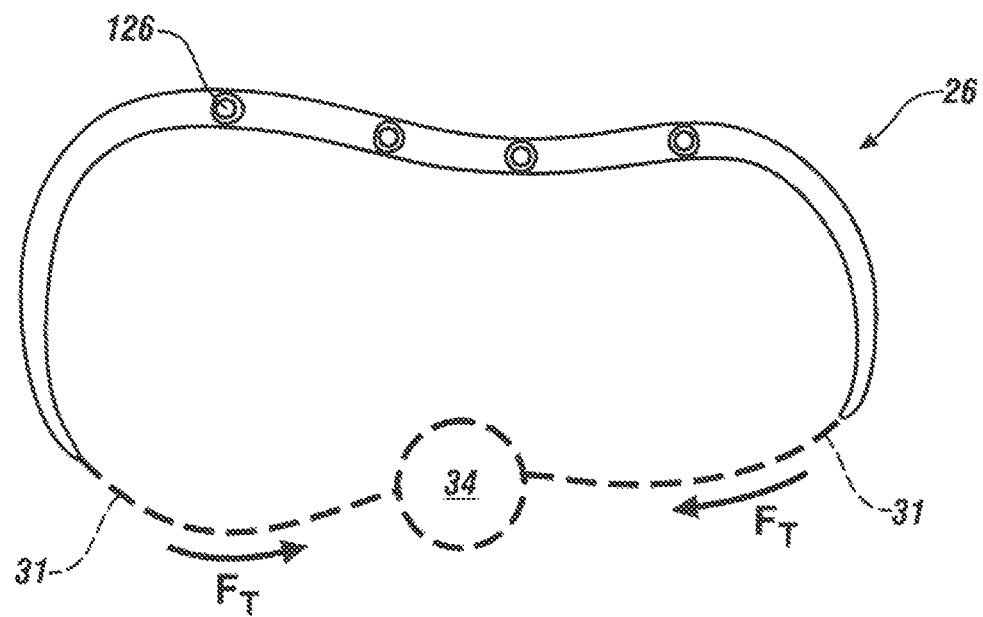
FIG. 8 is a schematic side-view illustration of a palm bar usable as part of the systems described herein.

Referring briefly to FIG. 8, a generally arcuate-shaped palm bar 26 may be connected to the restraint layer 14 of FIG. 4 and contoured to match the curvature of the palm 11P of the hand 11 (see FIG. 1). The palm bar 26 defines passages 126 through a width of the palm bar 26. The tendons 25, as shown in FIGS. 2 and 3, pass through the passages 126. Distal ends of the palm bar 26 may be mechanically-coupled to the ratchet mechanism 34, also shown in FIG. 5, e.g., via strings or adjustment wires 31. Thus, when the user rotates the ratchet mechanism 34, tension (arrows Fr) is applied to the adjustment wires 31 to tighten the palm bar 26 to the user's palm 11P (see FIG. 1).

FIG. 7 is a schematic data flow diagram describing a possible modular, multi-CPU embodiment of the controller 50. Other possible configurations include the use of a single processor, or a soft processor embodiment in which the control functionalities of the controller 50 are implemented using logic synthesis, e.g., by way of logic gates and/or integrated circuits augmented by electronic devices in the form of input/output circuitry, signal conditioning and buffer electronics, voltage regulators, capacitors, drivers, timing crystals, communication ports, etc., as well as application-specific sufficient amounts of read only memory, random access memory, and/or electrically-programmable read only memory. The controller 50 may also include one or more Application Specific Integrated Circuits (ASICs), microprocessors, associated memory, signal conditioning and buffer circuitry, and other components as needed to provide the described functionality. Software, firmware, programs, instructions, routines, code, algorithms and similar terms may be defined to mean any controller-executable instruction sets including calibrations and look-up tables.

The controller 50 as shown in the illustrative embodiment of FIG. 7 interfaces with and controls operation of the tendon actuators 22 (see FIGS. 2 and 3), including through respective motors 122 thereof in a rotary ball screw implementation. In the illustrated embodiment, the controller 50 may include a printed circuit board assembly (PCBA) 52 having an optional field programmable gate array (FPGA) 53, a plurality of motor controller central processing units (CPUs) 54, and a master controller CPU 55. Each motor controller CPU 54 receives corresponding motor control signals, e.g., a motor position and current (arrows 61) for the corresponding motors 122.

As a possible interface, the PCBA 52 may engage with multiple peripheral boards in a modular approach, with such modular approach boards generally referred to as tiles 60, including a sensor tile 60A and one or more motor tiles 60B, with the three motor tiles 60B shown in FIG. 7 corresponding to the example three-actuator embodiment of FIG. 2 described above. With reference to FIG. 2 as well, the various glove sensors 23 (e.g., 23A and/or 23B of the embodiments described herein) plug directly into the sensor tile 60A to electrically connect the glove sensors 23 to the PCBA 52, and to allow the input signals (arrow $CC_I$) to be transmitted to the sensor tile 60A, while the motor tiles 60B provide connectors for controlling the connected tendon actuators 22. External power may be supplied to the PCBA 52 and its connected devices at multiple voltages, e.g., 5 VDC logic, 36 VDC motor voltage, 12 VDC and 3.3 VDC motor logic, at one end of the PCBA 52. A communication interface 58 is provided to enable the PCBA 52 to be plugged into an external control device (not shown), such as a top-level controller or an optional human machine interface (HMI) 70.

Within the non-limiting example controller 50 shown in FIG. 7, the master controller CPU 55 provides core control architecture of the grasp assist system 10 of FIG. 1. As such, the main responsibility of master controller CPU 55 is to implement high-level control algorithms, e.g., overall coordination of the motor controller CPUs 54. The master controller CPU 55 may have multiple other responsibilities. For instance, the master controller CPU 55 may be configured to execute start-up routines in order to safely configure the grasp assist system 10. Additionally, the master controller CPU 55 may control the state of the grasp assist system 10 by monitoring parameters and faults from the individual motor controller CPUs 54 and responding to communicated commands, e.g., from an optional HMI 70.

The HMI 70 may be programmed to allow a user of the system 10 to selectively enable or disable grasp assistance, as well as to vary the amount of assistance/tension to be applied to the tendons 25 by the tendon actuators 22. Such parameters may include, by way of example, actuator positions, temperatures of the motors and drivers, and system-level communication and motion-stop parameters. Such parameters, some of which are shown for simplicity in FIG. 7 as originating with the motors 122, may be transmitted by individual sensors and/or may be otherwise determined by the motor controller CPUs 54. If a parameter exceeds calibrated bounds, the master controller CPU 55 may automatically disable control outputs while allowing the controller 50 to continue operating, e.g., by allowing the HMI 70 or other external control devices to examine what has occurred and enable recovery.

In an example embodiment, the motor tiles 60B may host a brushless DC motor driver capable of sourcing electrical current up to 8 $A_{RMS}$ from a voltage supply of up to 56 VDC. The motor tiles 60B may also read Hall-effect sensors, bus voltages, and motor phase currents to provide data needed for closed-loop control of the actuators 22 of FIGS. 2 and 3. With respect to the sensor tile 60A of FIG. 7, this tile may have multiple configurable groups, e.g., four groups of four individual interface circuits yielding 16 channels. All channels may be fed into a 16-channel analog-to-digital converter in order to be read by the controller 50. Of the 16 example channels, two groups may be configured to read the contact sensors 23B and two configured to read an output of the flexion sensors 23A of FIG. 2, e.g., FSRs and string potentiometers, respectively, without limitation. Such a configuration would yield 8 FSR channels and 4 string potentiometer channels.

Multiple modes of real-time operational control are enabled using the controller 50. In a first operating mode that may be conceptualized as a "power steering" mode, flexing of the user's fingers causes motion of the glove fingers 111F, which is measured or otherwise detected by the flexion sensor 23A. Such motion triggers closure of the entire glove of the grasp assist system 10 as a control response, somewhat akin to the manner in which a power steering motor or pump assists a driver during a power steering operation. That is, less power assist may be used for smaller motions of the user's hand and fingers, with higher levels of grasp assist provided for more extensive hand maneuvers. Such a control mode may be advantageous for executing certain work tasks requiring a secure, full-handed grasp on a work tool, such as wielding a cumbersome wrench during an extended EVA maneuver.

In a second operating mode, the flexion of the glove fingers 111F as measured by a given flexion sensor 23A triggers closure only of a corresponding finger. Such a mode may ensure that each finger 11F of the user's hand is independently controlled. In the second mode, all fingers 11F would require flexion or motion in order to trigger closure of the entire hand 11. Such an operational mode may be useful for dexterous tasks or when working with objects that could otherwise be forced out of the user's hand or shifted to a sub-optimal grasp position were the entire hand 11 to close on the object.

The controller 50 may operate on contact and/or force data from the contact sensors 23B by comparing contact or force data to predetermined "open" and "close" thresholds, with such thresholds possibly tuned for individual users. In a neutral state, i.e., when the tendon actuators 22 are not commanded to turn on, the controller 50 may compare the input values to a "close" threshold. Hysteresis may be built into the thresholds to allow the user to partially relax the grasp while still holding onto an object, which forces the controller 50 to open the glove responsive to deliberate movements of the user. Tuning is thus a balance between lagging action and inadvertent triggering/release of an object in the user's grasp.

One of ordinary skill in the art, in view of the above disclosure, will appreciate that the grasp assist system 10 may be used as the core technology underlying a control method. Such a method may include measuring, via the flexion sensor 23A, real-time flexing or change in relative position of each of the glove fingers 111F of FIG. 4. Responsive to measured flexion and the resultant change in attitude and/or relative position of the glove fingers 111F, such a method may include commanding one or more tendon actuators 22 of FIGS. 2 and 3, via the controller 50 of FIG. 7, to cause the tendon actuators 22 to apply tension to one of more of the tendons 25 at a tension level sufficient for moving the fingers 11F of the user (see FIG. 1) whenever the user executes a hand maneuver. The tendons 25, best shown in FIGS. 4 and 5, are operatively connected to the glove fingers 111F via the finger saddles 28, with each finger saddle 28 at least partially surrounding a phalange of a respective one of the glove fingers 11F. A non-limiting example of a distal phalange location is shown in FIGS. 4 and 5.

The method may include providing a restorative force in response to ending the hand maneuver, with such a restorative force being at a level sufficient for assisting the return of the flexible tendons 25 to a relaxed default position e.g., by pressurizing the optional bladder layer 12 of FIG. 1 using the external pressure supply 15. When using the optional contact sensors 23B, the method may include measuring or detecting contact between object during execution of the hand maneuver, and then adjusting tension to the tendons 25 via the tendon actuator(s) 22 in response to the measured contact forces.

While some embodiments have been described in detail herein, various alternative designs and embodiments exist for practicing the present teachings defined in the appended claims. Those skilled in the art, now having the benefit of this disclosure, will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined by the claims appended hereto.

The invention claimed is:

1. A grasp assist system comprising:
a glove having a glove palm and a plurality of glove fingers, wherein the glove is configured to be worn on a hand and fingers of a user;
a flexion sensor configured to output flexion signals indicative of a level of flexion of the hand and fingers of the user;
a plurality of finger saddles, each of which is positioned to at least partially surround a phalange of a respective one of the fingers of the user when the user wears the glove;
one or more tendon actuators;
a plurality of flexible tendons each connected to and driven by at least one of the one or more tendon actuators, wherein each of the flexible tendons is also connected to a respective one of the finger saddles;
a set of contact sensors connected to at least some of the glove fingers and configured to detect contact between the glove and an object during execution of a hand maneuver; and
a controller in communication with the one or more tendon actuators and the flexion sensor, wherein the controller is configured, in response to the flexion signals, to selectively apply tension to the plurality of flexible tendons via the one or more tendon actuators at a tension level sufficient for moving the fingers of the user and the glove fingers,
wherein the controller is in communication with the set of contact sensors and is configured to adjust the tension to the plurality of flexible tendons, via the one or more tendon actuators, in response to the contact, and
wherein the controller is configured to execute a first operating mode in which closure of the glove as a whole occurs in response to flexion of any one of the fingers of the user, and a second operating mode in which closure of a particular glove finger of the plurality of glove fingers occurs in response to detection of flexion of a finger of the user corresponding to the particular glove finger.

2. The grasp assist system of claim 1, wherein the flexion sensor includes a plurality of string potentiometers extending along a posterior of the glove fingers.

3. The grasp assist system of claim 1, wherein the glove includes a restraint layer to which is attached a palm bar spanning a width of the glove palm, a hardware layer containing the one or more tendon actuators, and an outer layer surrounding the restraint layer and the hardware layer.

4. The grasp assist system of claim 3, further comprising: a ratchet mechanism connected to an opposite side of the restraint layer relative to the palm bar, the palm bar defining passages circumscribing the flexible tendons, wherein distal ends of the palm bar are mechanically coupled to the ratchet mechanism such that a rotation of the ratchet mechanism adjusts a fit of the glove to the hand of the user.

5. The grasp assist system of claim 4, further comprising: a conduit manifold connected to a palm-side of the restraint layer adjacent to the palm bar, wherein each tendon of the plurality of flexible tendons is contained within respective conduits to form a Bowden cable system in which each of the respective conduits is received within the conduit manifold.

6. The grasp assist system of claim 1, wherein the glove is configured to provide a built-in restorative force such that, when the hand of the user is in a relaxed state, the built-in restorative force assists in a return of the flexible tendons to a relaxed default position.

7. The grasp assist system of claim 6, wherein the glove is configured to be pressurized by an external pressure supply, and wherein pressurization of the glove by the external pressure supply provides the built-in restorative force.

8. A grasp assist system comprising:
a glove having a glove palm and a plurality of glove fingers, wherein the glove is configured to be worn on a hand and fingers of a user and includes a pressurizable bladder layer, a restraint layer to which is attached a palm bar spanning a width of the glove palm, a hardware layer, and an outer layer surrounding the restraint layer and the hardware layer;
a flexion sensor configured to output flexion signals indicative of a level of flexion of the hand and fingers of the user, the flexion sensor including a plurality of string potentiometers extending along a posterior side of the glove fingers;
a plurality of flexible finger saddles, each of which at least partially surrounds a phalange of a respective finger of the user when the user wears the glove;
one or more tendon actuators contained within the hardware layer;
a plurality of flexible tendons each connected to and driven by at least one of the one or more tendon actuators, wherein each of the flexible tendons is connected to a respective one of the finger saddles and to a respective one of the tendon actuators, wherein pressurization of the bladder layer provides a built-in restorative force such that, when the hand of the user is in a relaxed state, the built-in restorative force assists in a return of the flexible tendons to a relaxed default position;
a conduit manifold connected to a palm-side of the restraint layer adjacent to the palm bar, wherein each tendon of the plurality of flexible tendons is contained within respective conduits to form a Bowden cable system in which each of the conduits is received within the conduit manifold;
a ratchet mechanism connected to an opposite side of the restraint layer relative to the palm bar, the palm bar defining passages circumscribing the conduits with tendons therein, wherein distal ends of the palm bar are mechanically coupled to the ratchet mechanism such that a rotation of the ratchet mechanism adjusts a fit of the glove; and
a controller positioned in communication with the one or more tendon actuators and the flexion sensor, wherein the controller is configured, in response to the flexion signals, to selectively apply tension to the plurality of flexible tendons via the one or more tendon actuators at a tension level sufficient for moving the fingers of the user and the glove fingers.

9. The grasp assist system of claim 8, further comprising: a set of contact sensors connected to at least some of the glove fingers and configured to detect contact with an object during execution of a hand maneuver, wherein the controller is in communication with the set of contact sensors and is configured to adjust the tension to the plurality of flexible tendons, via the one or more tendon actuators, in response to the contact.

10. The grasp assist system of claim 9, wherein the controller is configured to execute a first operating mode in which closure of the glove as a whole occurs in response to flexion of any one of the fingers of the user, and a second operating mode in which closure of a particular glove finger of the plurality of glove fingers occurs in response to detection of flexion of a finger of the user corresponding to the particular glove finger.

11. The grasp assist system of claim 9, wherein the controller includes a human machine interface programmed to allow the user to selectively enable or disable grasp assistance, and to selectively vary an amount of tension to be applied to the tendons by the tendon actuators.

\* \* \* \* \*